United States Patent [19]

Jordan et al.

[11] Patent Number: 5,560,868
[45] Date of Patent: Oct. 1, 1996

[54] HALIDE GLASS COMPOSITIONS AND OPTICAL CIRCUITS AND METHODS EMPLOYING SAME

[75] Inventors: Wayne G. Jordan, Berkshire; Animesh Jha, Uxbridge; Steven T. Davey, Ipswich, all of England

[73] Assignee: British Telecommunications public limited company, London, England

[21] Appl. No.: 436,455

[22] PCT Filed: Feb. 22, 1994

[86] PCT No.: PCT/GB94/00345

§ 371 Date: May 22, 1995

§ 102(e) Date: May 22, 1995

[87] PCT Pub. No.: WO94/19291

PCT Pub. Date: Sep. 1, 1994

[30] Foreign Application Priority Data

Feb. 22, 1993 [EP] European Pat. Off. .............. 93301266
Sep. 2, 1993 [EP] European Pat. Off. .............. 93306938
Sep. 2, 1993 [EP] European Pat. Off. .............. 93306939

[51] Int. Cl.$^6$ .............................. C03C 3/32; G02B 6/00; H01S 3/30; C09K 11/85
[52] U.S. Cl. .................................. 252/301.4 H; 252/387; 385/142; 359/341; 359/343; 501/37; 501/43; 501/151; 501/904
[58] Field of Search .............. 252/387, 301.4 H; 501/37, 43, 151, 904; 385/142; 359/341, 343

[56] References Cited

U.S. PATENT DOCUMENTS 5,309,452 5/1994 Ohishi et al. ..................... 385/142
5,351,335 9/1994 Ohishi et al. ..................... 385/142

FOREIGN PATENT DOCUMENTS 0350726 9/1990 European Pat. Off. ..
0420240 4/1991 European Pat. Off. ..

*Primary Examiner*—Melissa Bonner
*Attorney, Agent, or Firm*—Nixon & Vanderhye P.C.

[57] ABSTRACT

Halide glasses having particular utility as hosts for praseodynmium in order to provide optical amplification by laser activity have a halide content provided as a small proportion, e.g., 1–10 percent, of choride with the remainder as fluoride. The metal content is similar to conventional ZBLAN glasses. The replacement of Al by Y and In and/or the partial replacement of Na by Cs has synergistic benefits. $PR^{3+}$ constitutes a good lasing species for amplifying telecommunication signals at 1300 nm using pumped radiation at 1020 nm.

23 Claims, 1 Drawing Sheet

HALIDE GLASS COMPOSITIONS AND OPTICAL CIRCUITS AND METHODS EMPLOYING SAME

BACKGROUND OF THE INVENTION

1. Field of the Invention

This invention relates to halide glass compositions and more particularly to halozirconate glass compositions which have good properties as hosts for rare earth elements as lasting dopants. This invention also relates to optical waveguides and optical amplifier apparatus and method employing such compositions.

2. Related Art

It has long be recognised that the rare earth elements display fluorescence and this fluorescence can be utilised in the form of lasing either for the generation of optical signals or for the amplification of optical signals. Usually the lasing species is a trivalent ion of a rare earth element. In particular the trivalent ion $Pr^{3+}$ constitutes a lasing species for providing radiation at 1300 nm. This property is of interest because optical telecommunications uses signals at 1300 nm and the ion $Pr^{3+}$ is capable of amplifying such signals by laser action. It will be apparent that, in order to take advantage of this property, it is necessary to provide the active species in a suitable waveguiding structure, eg. a fibre waveguide.

The halide glasses have been recognised since 1978 and a wide range of compositions have been reported and their properties studied. It has been recognised that the halide glasses form good hosts for the rare earth elements as lasing species but the identification and selection of compositions having favourable properties remains difficult. In particular the prior art has failed to identify the glass compositions capable of lasing at 1300 nm with sufficient efficiency for use in telecommunications networks. This invention relates to compositions which have good properties. It is now convenient to discuss the properties of the glass required in a lasing device such as a fibre amplifier. These properties will be considered under three different headings.

GENERAL GLASS PROPERTIES

It is important that all glasses shall remain in the glass state, ie. they shall not devirtify under condition of use. It is also important that the glasses shall not be subject to crystallisation which might be considered as incipient devitrification. In addition it is also necessary that the compositions shall be suitable for use in glass forming and further processing. In particular it is necessary that a composition be stable in the melt, that it shall be capable of withstanding practical cooling rates and the conditions necessary for fibre forming, eg. during the pulling of a fibre preform into a fibre. It will also be apparent that chemical stability of the various glass components is important, eg it is desirable to avoid water soluble ingredients and, even more important, to avoid hygroscopic ingredients.

ATTENUATION

Lasing devices usually include waveguiding structures and it is clearly important to avoid unnecessary attenuation of either the signal wavelength or the pump wavelength. The requirement for low attenuation means that it is desirable to avoid components which have unnecessarily high absorptions at wavelengths of interest. It is also necessary to avoid scatter which emphasises some of the fundamental glass properties, ie. that the glass shall not form crystals even on a small scale.

HOST PROPERTIES

It also appears that there is interaction between the host glass and the lasing species. For example, the lasing species may undergo what is often called "non-radiative decay". This implies that the lasing species looses energy other than by the intended lasing transitions. Non-radiative decay represents a loss of energy and it is, therefore, an undesirable effect. It appears that the host glass may participate in non-radiative decay either in the sense that it may assist this undesired effect or help to inhibit it. Nevertheless, whatever the reason, it is established that the host glass can affect the efficiency of the lasing process and it is desirable to select the host so as to achieve good lasing efficiencies.

The hosting properties of the glass appear to have substantial effects upon the efficiency of a laser, eg. the ratio of signal power output to pump power input. This efficiency is of substantial importance in telecommunications because it may define the available gain of an amplifier. In experimental work, it is often convenient to utilise the lifetime of the excited state as a measure of the efficiency; the two quantities can be regarded as proportional to one another. In some theoretical papers it is considered that the multi-phonon absorption of the host affects the lifetime of the excited state and hence the efficiency of lasers based thereon.

It is important to recognise that the selection of a lasing composition, and especially the host glass, must take into account all of these features. Thus it is not necessarily appropriate to select ingredients solely on the basis of their effect upon the lasing performance if these components are liable to give rise to glass instability and high attenuations (which high attenuations may be the result of glass instability). In other words, selecting on the basis of one desirable feature is unlikely to produce acceptable results if this selection is accompanied by adverse effects.

It has been mentioned that the prior art has disclosed and evaluated a very wide range of different halide glasses. This range includes a well recognised group usually known as fluorozirconates. This sub-group of halide glasses has been recognised because its members perform well in respect of all of the above features. The chemical composition of the fluorozirconate glasses will now be described.

The major component is $ZrF_4$ which usually constitutes about 40–65 mole % of the total composition. In some variants the content of $ZrF_4$ is reduced in order to adjust the refractive index, eg. by incorporating $PbF_2$ or $HfF_2$. (Refractive index adjustment is important in the design of waveguiding structures ). A fluorozirconate composition usually contains about 10–39, eg. 15–25, mole % of an alkali metal fluoride, usually NaF. In addition, the composition often contains a substantial amount, eg. 10–25 mole % of $BaF_2$ with smaller amounts, eg. 2–6 mole %, of $LaF_3$ and $AlF_3$. It is emphasised that the halide content of a fluorozirconate glass is entirely fluoride. In the case of a lasing composition, the fluorozirconate host will also contain up to 1 mole % eg. 100–1000 ppm of the fluoride of a rare earth metal.

SUMMARY OF THE INVENTION

It has now been unexpectedly discovered that providing some of the halide as chloride and the remainder as fluoride has a beneficial effect on the lasing performance of $Pr^{3+}$ the lasing species. Most unexpectedly, the benefit is displayed by glasses in which the amount of chloride is small as a proportion of the total halide content. Thus enhanced lifetimes for the excited state, and hence improved lasing efficiencies, are achieved with glasses which contain between 0.5 and 10 wt %, preferably 1–5 wt % eg 3–4 wt % of chlorine based on the total composition. (It will be understood that the chlorine is present as chloride.) The halide not provided as chloride is provided as fluoride.

It has also been found that the advantages of using mixed halides applies to the fluorozirconate composition mentioned above; although once modified it is more appropriate to use the term fluorochlorozirconate composition.

It should be emphasised that the fluorozirconate compositions have been selected for substantial commercial application because of their good all round properties, especially their stability. This stability is associated with the fact that the whole of the halide content is fluoride. For example the equivalent chlorides are less desirable as glass forming materials because they are more water soluble and even hygroscopic. For these reasons it is usually considered highly undesirable to incorporate chloride into fluorozirconate compositions. This invention is therefore not only based on the unexpected discovery that very small substitutions of fluoride to chloride improve the lasing properties but they also appear to have beneficial effects on stability parameters.

It has also been discovered that other modifications to the standard fluorozirconate compositions also appear to enhance the lasing efficiency. Thus using a mixture of sodium and caesium halides, eg in the molar ratios Na:Cs=5:1 to 1:3 preferably 3:1 to 1:2 especially 1:1, increases the lifetime of the excited state. We have also found that using mixtures of indium and yttrium, eg in the molar ratio In:Y=3:1 to 1:3 especially 1:1, instead of aluminium enhances the effect.

The invention, which is defined in the claims, includes:

(i) the novel fluorochloro glasses containing $Pr^{3+}$ as the active species to support lasing as described above;

(ii) waveguiding structures, eg fibres, made from (i), especially waveguiding structures having path regions made of (i); and (iii) signal generators and photonic amplifiers utilising (i) to support lasing activity.

DETAILED DESCRIPTION OF EXEMPLARY EMBODIMENTS

Figure 1:
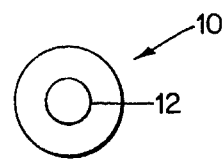
FIG. 1 illustrates a fibre waveguide having a glass core according to this invention.

Several compositions in accordance with the invention will now be described by way of example. Further compositions will also be described to provide a basis of comparison. In the comparison glasses the halide content is entirely fluoride.

Six glass compositions, in which the halide content is 100% 'fluoride' are given as a basis of comparison and these six compositions are defined in Table 1. These compositions were made by conventional preparative techniques, e.g. mixing the powdered ingredients in a crucible, melting and casting. All processes were carried out under clean, dry atmospheres such as $N_2$ or A. Oxygen may be present during part of the melting. A suitable technique is described in EP 170380.

TABLE 1

| Acronym | Fluorozirconate Compositions (mole %) | | | | | | | | |
|---------|------|------|-----|------|-----|------|-----|-----|------|
|         | ZrF4 | BaF2 | LaF3 | AlF3 | YF3 | InF3 | NaF | CsF | λ |
| ZBLAN   | 52 | 20 | 4 | 4 | — | — | 20 | — | 7.05 |
| ZBLYIN  | 52 | 20 | 4 | — | 2 | 2 | 20 | — | 7.23 |
| ZBLAC   | 55 | 22 | 4 | 4 | — | — | — | 15 | 7.10 |
| ZBLYIC  | 55 | 22 | 4 | — | 2 | 2 | — | 15 | 7.36 |
| ZBLANC  | 52 | 20 | 4 | 4 | — | — | 10 | 10 | 7.10 |
| ZBLYINC | 52 | 20 | 4 | — | 2 | 2 | 10 | 10 | 7.35 |

In addition, six fluorochloro compositions in accordance with the invention were also prepared. Three of these compositions were derived by modifying the last composition, ie. ZBLYINC of Table 1. One is a modification of the second item, ie. ZBLYIN, and the last is a modification of the first item of Table 1, namely ZBLAN. The chloride contents are given in Table 2. To prepare these glasses the appropriate proportion of fluoride ingredients is changed to the relevant chloride.

TABLE 2

| | Fluorochlorozirconate Compositions | | |
|---|---|---|---|
| Acronym | Cl wt % (±0.2) | λ | Δλ |
| ZBLYINC2 | 2.3 | 7.36 | 0.01 |
| ZBLYINC3 | 3.1 | 7.38 | 0.03 |
| ZBLYINC4 | 3.4 | 7.38 | 0.03 |
| ZBLYIN4  | 3.6 | 7.28 | 0.05 |
| ZBLAN4   | 3.7 | 7.10 | 0.05 |

By way of further illustration, a brief description of the preparation of ZBLYINC2 will now be given.

Anhydrous powders were mixed under dry nitrogen in the proportions:

ZrF4 52 mol %
BaF2 20 mol %
LaF3 4 mol %
YF3 2 mol %
InF3 2 mol %
NaF 5 mol %
CsF 5 mol %
NaCl 5 mol %
CsCl 5 mol %

Although this gives about 2.3 weight % of chlorine (as chloride) the molar ratio F:Cl is about 28:1.

The batch was heated in a Pt/Au crucible under flowing N2 at 400° C. for 1 hr, the temperature was raised to 850° C. and the glass was further heated under O2 for 2 hrs to oxidise the melt, this is followed by a further 1 hr at a lower temperature of 670° C., before casting. The casting was performed under partial vacuum lower with a flow of dry N2 to prevent bubble formation. A partial vacuum also applied during the glass melting process whilst the melt was at 670° C.

In addition to the ingredients specified in Tables 1 and 2 the compositions also contain 500 ppmw of Pr3+, based on the other ingredients. The Pr3+ is an active dopant capable of supporting lasing and amplifying activity.

The columns headed $\lambda$ in Tables 1 and 2 give the wavelength in micro metres which represents the limit of infra red transmission for the relevant composition. The composition will transmit at wavelengths shorter than $\lambda$ but attenuation is very high at wavelengths longer than $\lambda$. ($\lambda$ is usually known as the "infra red cut off".

Some theorists consider that the multi-phonon absorption properties of a glass affect many of its optical properties. For example it is considered that multi-phonon absorption affects the infra red cut off (ie. $\lambda$ as quoted in Tables 1 and 2) and also the interaction with lasing processes taking place within the glass. It is to be expected that halide glasses in which all the halide is chloride will have the infra red cut off at longer wave lengths than similar halide glasses in which all the halide is fluoride. However, the compositions defined in Table 2 only contain small amounts of chloride and this small substitution would not be expected to affect the infra red cut off (and, therefore, not the multi-phonon properties) of the glass. Hence, it would be expected that the lasing performance would be the same as in the all fluoride compositions. The $\Delta\lambda$ values quoted in Table 2 indicate, as expected, that the substitution of up to 4% chlorine for fluorine has little or no effect upon the infra red cut off of the composition and it is, therefore, surprising that the presence of the specified amount of chloride affects the lasing properties in the manner set out in greater detail below.

Before quoting numerical values it is appropriate to establish certain qualitative comparisons.

The halides of Zr, Ba and La are the primary glass forming constituents and these three halides constitute about 75 mole % of the composition. These three metals can be partially replaced by other metals, eg. Hf, in order to adjust refractive index to provide waveguiding structures.

Conventional fluorozirconate glasses contain AlF3 but this can be replaced with halides of indium and yttrium with beneficial effects as set out quantitatively below.

Alkali metal halides are required to provide a stable glass composition and this is usually provided as NaF. The replacement of Na by Cs has been proposed but we have found that in systems wherein all of the halide is fluoride, this replacement tends to result in a significant decrease in the stability of the glass. In conventional systems, therefore, it is not considered desirable to replace Na by Cs.

Three important performance parameters were measured for the glass compositions quoted defined in Tables 1 and 2 and the results are quoted in Table 3. It is emphasised that all of these compositions contain 500ppmw of $Pr^{3+}$.

TABLE 3

| Acronym | Life (μs) | Stability | Tx-Tg |
|---|---|---|---|
| ZBLAN | 107 | 6.74 | 92 |
| ZBLYIN | 126 | 3.41 | 83 |

TABLE 3-continued

| Acronym | Life (μs) | Stability | Tx-Tg |
|---|---|---|---|
| ZBLAC | 106 | 4.21 | 70 |
| ZBLYIC | 120 | 2.48 | 70 |
| ZBLANC | 108 | 3.26 | 71 |
| ZBLYINC | 134 | 6.77 | 90 |
| ZBLYINC2 | 137 | 5.41 | 105 |
| ZBLYINC3 | 147 | 10.56 | 107 |
| ZBLYINC4 | 153 | 13.03 | 105 |
| ZBLYIN4 | 163 | 3.55 | 76 |
| ZBLAN4 | 149 | 5.07 | 77 |

The column headed "life" in Table 3 gives the fluorescence lifetime of the $Pr^{3+}$ in the specified host. The fluorescence was stimulated by pump radiation at 1020 nm provided with an Ar+ pumped Ti: sapphire laser. The lifetime specifies the rate of decay of fluorescence after the pump has been switched off. The fluorescence is at 1300 nm and it corresponds to the lasing transitions ($^1G_4 \to {}^3H_5$) which would be needed in a telecommunications amplifier operating at this wavelength. The efficiency of the laser is proportional to the lifetime.

The other two columns, headed "stability" and "$T_x-T_g$", both relate to the stability of the glass. More specifically three glass parameters are involved, these are:

$T_g$=the glass transition temperature, $T_x$=temperature of onset of crystallisation.

$T_p$=temperature of peak crystallisation

The "stability", represented as S, is calculated as:

$S=[(T_p-T_x)(T_x-T_g)]/T_g$ $T_g$ and $T_x$ and $T_p$ were all read off from differential scanning calorimetry curves obtained using an isochronal heating rate of 20° C./minute. The stability and ($T_x-T_g$) are parameters which represent the thermal stability of the glass and the higher the parameter the better. However the overall properties which make a glass suitable for using in a waveguide are even more complicated and the stability parameter represents only one important feature of the overall performance.

To simplify comparison the results shown in Table 3 are rearranged in Table 4.

It will be noted that Table 4 has an upper zone relating to compositions containing aluminium and a lower zone relating to the equivalent compositions in which the aluminium is replaced by an equimolar mixture of yttrium and indium.

Similarly Table 4 has a left-hand zone relating to compositions in which the whole of the alkali metal content is sodium, a right-hand zone in which the whole of the alkali metal content is caesium and a centre zone which relates to those compositions containing caesium and sodium halide in equimolar quantities.

Results are also arranged to facilitate comparison between varying halide content of compositions with the same metal content. The "life" headed as L and the "stability" headed as S are given side-by-side.

It is emphasised that Table 4 relates to the compositions defined in Tables 1 and 2 and the results are merely copied from Table 3.

TABLE 4

| | Zr/Ba/La halides common to all glasses | | | | | |
|---|---|---|---|---|---|---|
| | Na | | Na/Cs | | Cs | |
| | L | S | L | S | L | S |
| Al (0% Cl) | 107 | 6.84 | 110 | 3.26 | 106 | 4.21 |
| Al (4% Cl) | 149 | 5.07 | — | — | — | — |
| Y/In | | | | | | |
| (0% Cl) | 126 | 3.41 | 134 | 6.77 | 120 | 2.48 |
| (2% Cl) | — | — | 140 | 5.41 | — | — |
| (3% Cl) | — | — | 147 | 10.56 | — | — |
| (4% Cl) | 163 | 3.55 | 153 | 13.03 | — | — |

It will noted that, up to the given limits, changing fluoride into chloride increases the fluorescent lifetime and hence the lasing efficiency. However, as indicated above, this would be expected to cause substantial reduction in stability.

Table 4 also shows that the effect of other substitutions is more complicated in that they depend upon one another and, in certain circumstances, appear to display strong synergistic activity. Thus the highest lifetime in Table 4 is 163 μs which is given by the composition having the acronym ZBLYIN but the stability parameter is low at 3.55 as compared with 6.84 for the standard fluorozirconate glass (ZBLAN) which has a lifetime of only 107 μs. However changing some of the sodium into caesium reduces the lifetime to 153 μs but increases the stability parameter to 13.03.

The comparisons illustrated in Table 4 indicate that changing a small amount of fluoride into chloride is beneficial for a wide range of glasses and that the beneficial effect of fluoride into chloride conversion is enhanced by both the replacement of aluminium by yttrium/indium and also by the partial replacement of sodium by caesium.

It should also be noted that, in absence of chloride, the substitution of Y/In for Al and/or the partial substitution of Cs for Na have adverse effects upon stability. Surprisingly these substitutions have a beneficial effect in the presence of chloride.

The glass compositions according to the invention contain $Pr^{+3}$ as the lasing dopant and they are useful in amplifiers for telecommunications signals at a nominal wavelength of 1300 nm. Such signals have a band width which usually extends as low as 1260 nm and/or as high as 1340 nm. Signals with this nominal wavelength can be amplified using the lasing transition $^1G_4 \rightarrow ^3H_5$ and the $Pr^{+3}$ is pumped using a nominal wavelength of 1020 nm, e.g. using the band 960–1080 nm.

Lead fluoride, $PbF_2$, is often used in fluorozirconate glasses. It has been noticed that lead, especially at high concentrations, may tend to cause instability in glasses which contain chloride. Hence it is preferred to avoid the use of lead in fluorochlorozirconate glasses. Glass compositions according to this invention include a halide glass composition having fluorescent and lasing properties which composition consists of a host glass and 0.001 to 1 weight % based on the host glass composition of an active dopant capable of supporting fluorescence or lasing activity, the active dopant being $Pr^{+3}$ and the host glass being halide glass wherein 0.1 to 10 wt % of the total composition is chlorine and the remainder of the halide is fluorine, the chlorine and fluorine being present as chloride and fluoride respectively. Such composition may have a concentration of $Pr^{+3}$ 0.001 to 0.1 wt %. Further, such glass composition host glass may contain:

(a) 60–80% of one or more metal halides selected from the halides of Zr, Ba, La, and Hf;

(b) 10–39% of at least one alkali metal halide and (c) 1–10% of at least one metal halide selected from the halides of Al, Y and In provided that the total amount of halide of Zr and Hf is at least 45% and all of the percentages are molar percentages based on the total composition.

The composition as just described may include an amount of alkali metal halide between 15 and 25%. Furthermore, the alkali metal halide may consist of halides of two or three alkali metals which are selected from Na, Cs and Li. The mole ratio Na:Cs may be from 5:1 to 1:3. The item (c) above may be selected from only the halides of Y and In and the mole ratio of Y:In may be within the range 2:3 to 3:2. The amount of the halide of Zr may be 45 mole %–55 mole % based on the total host composition. Such glass composition may have a chlorine content of 1–5 wt %, or, preferably, from 3–4 wt %.

Figure 2:
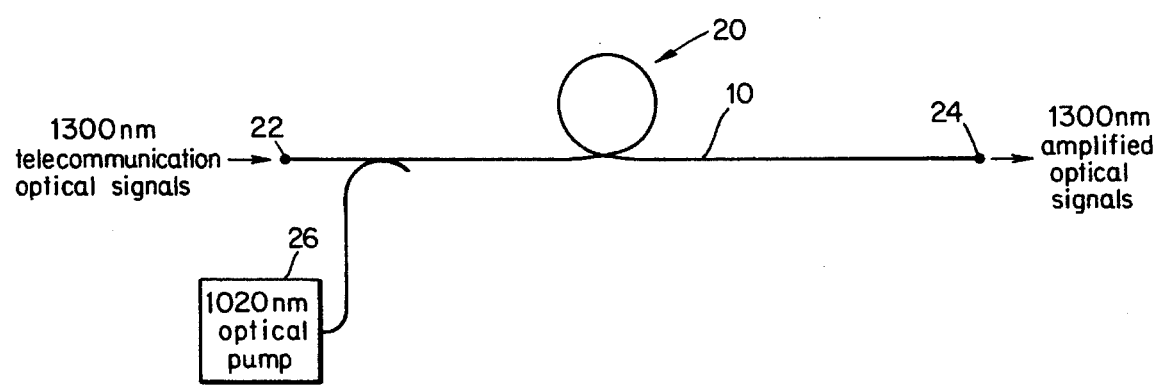
FIG. 2 illustrates an optical amplifier and a related method of amplifying telecommunications signals in accordance with this invention.

A fibre waveguide 10 is depicted in FIG. 1 wherein the core 12 is made of a glass composition according to the above teachings. An optical amplifier 20 is depicted in FIG. 2 as including waveguide 10, an input port 22 for connecting said waveguide to receive attenuated optical signals, an output port 24 for providing amplified optical signals for onward transmission and a pump 26 for providing pump radiation into the core so as to provide power to sustain optical amplification by lasing activity. The apparatus of FIG. 2 provides a method of amplifying telecommunication signals at a nominal wavelength of 1300 nm. Such signals are input into a glass composition of the type just described and simultaneously providing into such glass composition pump radiation at a nominal wavelength of 1020 nm whereby the pump radiation excites included $Pr^{3+}$ into an inverted state to generate more photons at 1300 nm whereby the signals are amplified.

We claim:

1. A halide glass composition having fluorescent and lasing properties which composition consists of:

a host glass and 0.001 to 1 weight % based on the host glass composition of an active dopant capable of supporting fluorescence or lasing activity, wherein the active dopant is $Pr^{3+}$ and the host glass is a halide glass which contains halides of at least two alkali metals, said alkali metals being selected from Na, Cs and Li, and wherein 0.1 to 10 wt % of the total composition is chlorine and the remainder of the halide is fluorine, said chlorine and fluorine being present as chloride and fluoride respectively.

2. A halide glass composition as in claim 1, wherein concentration of $Pr^{3+}$ is from 0.001 to 0.1 wt %.

3. A glass composition as in claim 1 wherein the host glass contains:

(a) 60–80% of one or more metal halides selected from the halides of Zr, Ba, La, and Hf;

(b) 10–39% of said at least two alkali metal halides, and (c) 1–10% of at least one metal halide selected from the halides of Al, Y and In provided that the total amount of halide of Zr and Hf is at least 45% and all of the percentages are molar percentages based on the total composition.

4. A composition as in claim 3, wherein the amount of item (b) is between 15 and 25%.

5. A halide glass composition having fluorescent and lasing properties which composition consists of:

a host glass and 0.001 to 1 weight % based on the host glass composition of an active dopant capable of supporting fluorescence or lasing activity, wherein the active dopant is $Pr^{3+}$ and the host glass is a halide glass, wherein 0.1 to 10 wt % of the total composition is chlorine and the remainder of the halide is fluorine, said chlorine and fluorine being present as chloride and fluoride respectively, wherein the host glass contains:
60–80% of one or more metal halides selected from the halides of Zr, Ba, La, and Hf;
(b) 10–39% of at least one alkali metal halide and
(c) 1–10% of at least one metal halide selected from the halides of Al, Y and In provided that the total amount of halide of Zr and Hf is at least 45% and all of the percentages are molar percentages based on the total composition; and wherein item (b) consists of halides of two or three alkali metals which are selected from Na, Cs and Li.

6. A composition as in claim 5, in which the mole ratio Na:Cs is 5:1 to 1:3.

7. A halide glass composition having fluorescent and lasing properties which composition consists of:

a host glass and 0.001 to 1 weight % based on the host glass composition of an active dopant capable of supporting fluorescence or lasing activity, wherein the active dopant is $Pr^{3+}$ and the host glass is a halide glass, wherein 0.1 to 10 wt % of the total composition is chlorine and the remainder of the halide is fluorine, said chlorine and fluorine being present as chloride and fluoride respectively, wherein the host glass contains:
(a) 60–80% of one or more metal halides selected from the halides of Zr, Ba, La, and Hf;
(b) 10–39% of at least one alkali metal halide and
(c) 1–10% of at least one metal halide selected from the halides of Al, Y and In provided that the total amount of halide of Zr and Hf is at least 45% and all of the percentages are molar percentages based on the total composition; and wherein item (c) is selected from the halides of Y and In.

8. A glass composition as in claim 7, wherein the mole ratio of Y:In is within the range 2:3 to 3:2.

9. A glass composition as in claim 3 wherein the amount of the halide of Zr is 45 mole %–55 mole % based on the total host composition.

10. A glass composition as in claim 1 wherein said chlorine content is 1–5 wt %.

11. A halide glass composition having fluorescent and lasing properties which composition consists of:

a host glass and 0.001 to 1 weight % based on the host glass composition of an active dopant capable of supporting fluorescence or lasing activity, wherein the active dopant is $Pr^{3+}$ and the host glass is a halide glass, wherein 0.1 to 10 wt % of the total composition is chlorine and the remainder of the halide is fluorine, said chlorine and fluorine being present as chloride and fluoride respectively; and wherein the chlorine content is 3–4 wt %.

12. A fibre waveguide wherein the core is made of a glass composition as in claim 1.

13. An optical amplifier which comprises:

a waveguide according to claim 12, an input port for connecting said waveguide to receive attenuated optical signals, an output port for providing amplified optical signals for onward transmission, and a pump for providing pump radiation into the core so as to provide power to sustain optical amplification by lasing activity.

14. A method of amplifying telecommunication signals at a nominal wavelength of 1300 nm, which method comprises:

providing said signals into a glass composition according to claim 1, and simultaneously providing into said glass composition pump radiation at a nominal wavelength of 1020 nm whereby said pump radiation excites said $Pr^{3+}$ into an inverted state to generate more photons at 1300 nm whereby said signals are amplified.

15. A composition as in claim 1 in which the mole ratio Na:Cs is 5:1 to 1:3.

16. A glass composition as in claim 3 wherein item (c) is selected from the halides of Y and In.

17. A glass composition as in claim 16 wherein the mole ratio of Y:In is within the range from 2:3 to 3:2.

18. A glass composition as in claim 1 where the chlorine content is 3–4 wt %.

19. A glass composition as in claim i wherein both Na and Cs halides are present.

20. A glass composition as in claim 19 wherein the content of Na and Cs is present in the relative amounts Na:Cs from 5:1 to 1:3.

21. A flurozirconate glass having fluorescent and lasing properties consisting of:

a host flurozirconate glass composition containing 3–4 weight % chlorine; and an active dopant including $Pr^{3+}$ dispersed within the host glass to provide said fluorescent and lasing properties.

22. A flurozirconate glass having fluorescent and lasing properties consisting of:

a host flurozirconate glass composition containing sodium and cesium; and an active dopant including $Pr^{3+}$ dispersed within the host glass to provide said fluorescent and lasing properties.

23. A flurozirconate glass having fluorescent and lasing properties consisting of:

a host flurozirconate glass composition containing yttrium and indium; and an active dopant including $Pr^{3+}$ dispersed within the host glass to provide said fluorescent and lasing properties.

* * * * *